United States Patent
Lee

(10) Patent No.: US 9,354,922 B2
(45) Date of Patent: May 31, 2016

(54) METADATA-DRIVEN WORKFLOWS AND INTEGRATION WITH GENOMIC DATA PROCESSING SYSTEMS AND TECHNIQUES

(71) Applicant: International Business Machines Corporation, Armonk, NY (US)

(72) Inventor: Frank N. Lee, Sunset Hills, MO (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 14/243,301

(22) Filed: Apr. 2, 2014

(65) Prior Publication Data

US 2015/0286495 A1 Oct. 8, 2015

(51) Int. Cl.

| | |
|---|---|
| *G06F 3/00* | (2006.01) |
| *G06F 3/048* | (2013.01) |
| *G06F 7/00* | (2006.01) |
| *G06F 9/46* | (2006.01) |
| *G06F 17/30* | (2006.01) |
| *G06Q 10/06* | (2012.01) |
| *G06Q 10/10* | (2012.01) |

(52) U.S. Cl.
CPC ............. *G06F 9/46* (2013.01); *G06F 17/30722* (2013.01); *G06Q 10/06* (2013.01); *G06Q 10/10* (2013.01); *G06F 17/30064* (2013.01)

(58) Field of Classification Search
CPC ....... G06F 19/12; G06F 19/28; G06F 21/645; G06F 17/30289; G06F 17/30345; G06F 17/30477; G06F 17/50; G06F 17/30064; G06F 17/30292; G06F 17/30722; G06F 17/3012; G06F 17/30595; G06F 19/22; G06Q 10/06; G06Q 10/10; G06Q 10/107; G06Q 10/63

See application file for complete search history.

(56) References Cited

U.S. PATENT DOCUMENTS 6,782,394 B1 * 8/2004 Landeck ........... G06F 17/30595
7,139,757 B1 * 11/2006 Apollonsky ...... G06F 17/30722

(Continued)

OTHER PUBLICATIONS

David Rogers et al., Bundle and Pool Architecture for Multi-language, Robust, Scalable workflow executions, 2013, [Retrieved on Feb. 2, 2016]. Retrieved from the internet: <URL: http://download.springer.com/static/pdf/997/art%0253A10.1007%252Fs10723-013-9267-2.pdf?> 24 Pages (457-480).*

(Continued)

*Primary Examiner* — Thuy Dao
*Assistant Examiner* — Anibal Rivera
(74) *Attorney, Agent, or Firm* — Zilka-Kotab, PC

(57) ABSTRACT

Systems, methods and computer program products configured to provide and perform metadata-based workflow management are disclosed. The inventive subject matter includes a computer readable storage medium having computer readable program instructions embodied therewith. The computer readable program instructions are configured to: initiate a workflow configured to process data; associate the data with metadata; and drive at least a portion of the workflow based on at least some of the metadata. The metadata include anchoring metadata; common metadata; and custom metadata. Inventive subject matter also encompasses a method for managing genomic data processing workflows using metadata includes: initiating a workflow; receiving a request to manage the workflow using metadata comprising: anchoring metadata, common metadata, and custom metadata, associating the metadata with the data; and driving at least a portion of the workflow based on the metadata. The workflow involves genomic analyzes.

18 Claims, 7 Drawing Sheets

(56) References Cited

U.S. PATENT DOCUMENTS

| | | | | |
|---|---|---|---|---|
| 7,302,431 | B1* | 11/2007 | Apollonsky | G06Q 30/02 |
| 8,126,912 | B2 | 2/2012 | King et al. | |
| 8,812,752 | B1* | 8/2014 | Shih | G06Q 10/063 |
| | | | | 710/29 |
| 8,818,961 | B1* | 8/2014 | Beatty | G06F 17/30292 |
| | | | | 707/685 |
| 2004/0199867 | A1* | 10/2004 | Brandenborg | G06Q 10/06 |
| | | | | 715/201 |
| 2005/0125419 | A1 | 6/2005 | Mizutani et al. | |
| 2006/0155713 | A1* | 7/2006 | Singh | G06Q 10/06 |
| 2008/0034055 | A1* | 2/2008 | Das | G06Q 10/10 |
| | | | | 709/217 |
| 2008/0092074 | A1* | 4/2008 | Cohen | G06F 8/10 |
| | | | | 715/771 |
| 2008/0189655 | A1* | 8/2008 | Kol | G06Q 10/10 |
| | | | | 715/808 |
| 2009/0063470 | A1 | 3/2009 | Peled et al. | |
| 2009/0119576 | A1 | 5/2009 | Pepper et al. | |
| 2009/0182610 | A1* | 7/2009 | Palanisamy | G06Q 10/10 |
| | | | | 707/600 |
| 2009/0299650 | A1* | 12/2009 | Nelson | G06F 19/28 |
| | | | | 702/20 |
| 2010/0083173 | A1* | 4/2010 | Germann | G06F 17/3012 |
| | | | | 715/810 |
| 2010/0275228 | A1 | 10/2010 | Panje | |
| 2011/0246900 | A1* | 10/2011 | Hedges | G11B 27/034 |
| | | | | 715/738 |
| 2012/0078709 | A1 | 3/2012 | Dunham et al. | |
| 2012/0227044 | A1* | 9/2012 | Arumugham | G06Q 10/06 |
| | | | | 718/100 |
| 2013/0124471 | A1* | 5/2013 | Chen | H04N 5/23238 |
| | | | | 707/624 |
| 2013/0245958 | A1* | 9/2013 | Forster | G06F 19/22 |
| | | | | 702/19 |
| 2013/0246460 | A1* | 9/2013 | Maltbie | G06F 19/28 |
| | | | | 707/771 |
| 2013/0254897 | A1* | 9/2013 | Reedy | G06F 21/10 |
| | | | | 726/26 |
| 2014/0282177 | A1* | 9/2014 | Wang | G06F 3/0481 |
| | | | | 715/771 |
| 2014/0310623 | A1* | 10/2014 | O'Connell, Jr. | G06F 17/30064 |
| | | | | 715/764 |

OTHER PUBLICATIONS

Wenjun Wu et al., Creating a Cloud-based life Science Gateway, 2011 IEEE, [Retrieved on Feb. 2, 2016]. Retrieved from the internet: <URL: http://ieeexplore.ieee.org/stamp/stamp.jsp?tp=&arnumber=6123259> 7 Pages (55-61).*

Storey et al., "How Software Developers Use Tagging to Support Reminding and Refinding," IEEE Transactions on Software Engineering, vol. 35, No. 4, Jul./Aug. 2009, pp. 470-483.

"Method for Metadata Repository Tagging and Intelligent Tag Generation," IBM, IPCOM000185125D, Jul. 13, 2009, pp. 1-4.

BioPerl, Main Page, last modified Aug. 21, 2012, pp. 1-2.

Biopython, Introduction Page, last modified Dec. 6, 2013, pp. 1-2.

NIST Cloud Computing Program, http://www.nist.gov/itl/cloud/, Last Updated Nov. 13, 2013, p. 1-2.

Mell et al., "The NIST Definition of Cloud Computing," NIST National Institute of Standards and Technology, U.S Department of Commerce, Special Publication 800-145, pp. ii-3.

Mell et al., "The NIST Definition of Cloud Computing," National Institute of Standards and Technology, Information Technology Laboratory, Version 15, Oct. 7, 2009, pp. 1-2.

* cited by examiner

FIG. 5A

| | | |
|---|---|---|
| WFL | 100 | 502 |
| STE | 1000 | 504 |
| INS | 454 | 506 |
| PRJ | ABC | 508 |
| SMP | CHR02 | 510 |
| ASS | XYZ | 512 |
| STP | 2 | 522 |
| APP | GDE | 524 |
| VER | 2.7 | 526 |
| FIL | FASTQ | 532 |

| | | |
|---|---|---|
| Workflow | WFL=100 | 502 |
| Site | STE=1000 | 504 |
| Instrument | INS=454 | 506 |
| Project | PRJ=ABC | 508 |
| Sample | SMP=CHR02 | 510 |
| Assay | ASS=XYZ | 512 |
| Step | STP=2 | 522 |
| Application | APP=GDE | 524 |
| Version | VER=2.7 | 526 |
| File Type | FIL=FASTQ | 532 |

550

410, 420, 430, 520, 530

METADATA-DRIVEN WORKFLOWS AND INTEGRATION WITH GENOMIC DATA PROCESSING SYSTEMS AND TECHNIQUES

BACKGROUND

The present invention relates to metadata in cloud storage systems and networks, and more particularly, this invention relates to generation and management of metadata driven by genomic sequence analysis and genomic sequence data processing workflows.

To date, metadata have been applied in limited contexts, e.g. to allow human users to manually annotate image data shared via a social network. The limitations give rise to a technical gap between these conventional user-mediated metadata applications and the restrictive, regimented constraints imposed by data storage, management, and/or processing environments common to high throughput data processing centers, high volume data storage solutions, and related systems that operate using large volumes of data, high-volume data processing operations, an/or related data storage and retrieval solutions. A primary example of such high-volume data management/processing applications is genome data processing and genome sequence analysis, which conventionally includes processing data on the order of millions to trillions of units (e.g. image files, sequence reads, etc.) in a single operation or series of operations.

Accordingly, it would be beneficial to provide systems, techniques, and computer program products that manage and organize metadata in a workflow-centric rather than the conventional annotation-centric manner.

For example, workflow-centric metadata management and organization techniques, systems, and computer program products can provide advantageous features and functionalities including but not limited to: (1) seamlessly coupling metadata with workflows, especially coupling workflow and/or metadata creation, access, replication, migration, distribution and/or consumption; (2) scalability to accommodate data processing performance and/or capacity requisite to enable real-time data acquisition and/or data processing for systems handling data volumes on the order of billions of data objects or more; (3) applicability to high-performance-computing and/or cloud-computing environments and associated resources; (4) flexibility to design and deploy custom metadata as provenance for workflow(s); and/or (5) facile adaptability to genomic data acquisition and analysis tools and techniques.

BRIEF SUMMARY

In one embodiment, a computer program product for driving workflows using metadata includes a computer readable storage medium having program instructions embodied therewith. The program instructions are executable by a processor, and cause the processor to: initiate a workflow configured to process data; associate the data with metadata comprising: anchoring metadata configured to uniquely identify the workflow; common metadata comprising one or more characteristics selected from: sample characteristics, processing site characteristics, laboratory characteristics, instrument characteristics, assay characteristics, temporal characteristics, security characteristics and project characteristics; and custom metadata comprising one or more of workflow characteristics and data characteristics; and drive at least a portion of the workflow based on at least some of the metadata.

In another embodiment, a method for managing genomic data processing workflows using metadata includes: initiating a workflow; receiving a request to manage the workflow using metadata; associating the metadata with the data; and driving at least a portion of the workflow based on the metadata. The metadata comprise: anchoring metadata, common metadata, and custom metadata, and the workflow includes one or more genomic analysis operations selected from: base calling; sequence alignment, variant calling, phylogenetic analysis, primer design, amplicon design, and homology analysis.

In still another embodiment, a computer program product for driving workflows using metadata includes a computer readable storage medium having program instructions embodied therewith. The program instructions are executable by a processor, and cause the processor to: receive workflow data and metadata associated with the workflow data; distribute the workflow data and the associated metadata across a plurality of distributed resources of a cloud computing environment; and index the workflow data according to the metadata. The metadata include plural generations of metadata, and each generation corresponds to at least one operation of the workflow.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5A is a tabular schematic representing metadata organization and structure, according to one embodiment.

FIG. 5B is a tabular schematic representing metadata organization and structure, according to one embodiment.

DETAILED DESCRIPTION

Figure 1:
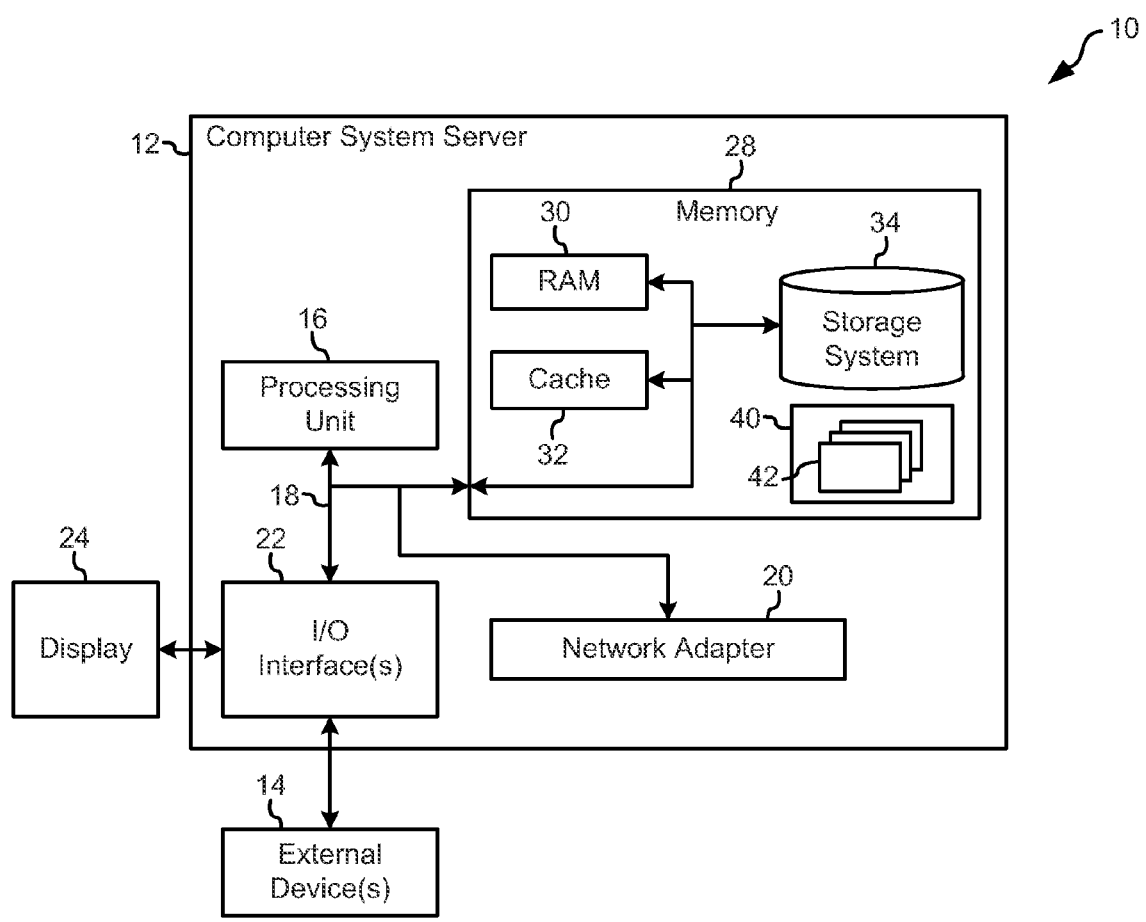
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of metadata-driven workflows. Preferred metadata-driven workflows are configured to provide and facilitate high-performance analysis, storage, and management of genomic data, particularly genome sequence data such as generated using so-called "next-generation" sequencing instrumentation, such as de novo sequencing instruments leveraging dideoxy termination (also known as "Sanger") chemistry, polony sequencing, pyrosequencing, Illumina sequencing, SOLiD sequencing, Ion Torrent semiconductor sequencing, DNA nanoball sequencing, single molecule sequencing, nanopore sequencing, hybridization sequencing, mass-spectrometry-based sequencing, microscopy-based sequencing, etc. as would be understood by one having ordinary skill in the art upon reading the present descriptions.

The presently disclosed inventive concepts provide embodiments high-performance, scalable, and distributed methods, systems and computer program products offering functionality capable of recording, tracking and applying extraneous or extrinsic knowledge regarding data. For example, in one approach knowledge regarding data may be represented via a plurality of metadata "tags" associated with the data and descriptive of the data or information relevant to the data, such as described in further detail below and would be understood by one having ordinary skill in the art upon reading the present descriptions.

The present concepts confer advantages in at least three capacities: 1) high-performance data storage, management and processing environment and resources leverage the instant metadata-driven workflow techniques to facilitate real-time recording of data provenance without adding to overall system I/O and/or processing load, 2) scalability of the techniques enable data tracking rates to match the growth of any storage and/or computational hardware platform; and 3) the distributed design allows the knowledge of data to be shared across systems, grid, and cloud, regardless where the data physically reside, e.g. via sharing metadata reflecting the knowledge of the data.

In a preferred approach, the present techniques, computer program products, and systems leverage IBM General Parallel File System (GPFS) and extended attributes thereof to create, inject, harness and distribute custom metadata, especially for applications storing, managing, processing, etc. genomic data.

Preferably, as data are created and modified by a computational workflow or migrated from one storage system to another, the inventive concepts presented herein apply, manage, and/or leverage the knowledge reflected in the metadata associated with the workflow data. The metadata are preferably associated with the workflow data and comprise one or more custom tags reflecting information related to the creation, management, processing, manipulation, etc. of the workflow data.

For example, in the context of the genomic data scenario introduced above, metadata may include custom tags reflecting knowledge of which instrument (e.g. which sequencing instrument, in applications involving genetic sequence data generation, acquisition and/or analysis) was utilized to generate/acquire the data, for which project the data were generated/acquired (e.g. a processing project defined within the distributed system or a laboratory "project" such as may be associated with a particular source of funds or connected to producing a particular publication, as would be understood by one having ordinary skill in the art upon reading the present descriptions.

In more embodiments, the present systems, techniques, and computer program products also confer functionality that enables the workflow(s) utilizing the data to generate additional information and associate the additional information with the data as new or modified metadata tags. Preferably, the additional information includes information relating to processing the data via the workflow, e.g. a workflow ID, processing settings, user information, system information, application or tool information, variable information, etc. as would be understood by one having ordinary skill in the art upon reading the present descriptions.

Accordingly, in preferred embodiments it is advantageous to extend workflow functionalities to allow and facilitate modification of workflow, e.g. to allow a script or application to trigger the injection of "metadata" information such as described herein to the file or operating system (e.g. using native file or operating system commands, such as a Linux command, in one embodiment).

Once injected into the file system, the custom tags preferably become an integral part of the metadata associated with the data file(s), and be used for many data management functions including searching, indexing, migration, replication, or in some customized use cases, subsetting data collection based on combinatorial criteria (e.g. before being submitted to an external compute or data cloud, in one approach).

The inventive topics presented herein also provide a set of tools to facilitate injection and harnessing of metadata in large batches (e.g. millions of files) requisite to being applicable to distributed high-performance compute environments such as referred to throughout these descriptions.

In various illustrative approaches, the aforementioned tools are preferably embodied as one or more shell scripts, Perl/Python or C/C++ programs, plugins, applets, applications, etc. as would be understood by one having ordinary skill in the art upon reading the present descriptions. Even more preferably, the tools are configured to systematically extract existing metadata and/or populate corresponding information into a local or cloud instance of a relational data warehouse (DW). Once the metadata are populated into the DW, the metadata are instantly available for the system and/or users to leverage toward purposes including but not limited to data access (e.g. for search, query or as used via APIs for data retrieval). In particularly preferred approaches, the metadata are embodied as attributes, each attribute comprising a key/value pair) will follow an institutional standard for sharing among organizations.

Using the presently disclosed techniques, systems, and/or computer program products, it is therefore capable to provide the advantages of a "metadata service engine" that can be used to track, monitor and facilitate the sharing of data and/or associated metadata in any number of analytical systems, and especially analytical systems configured to store, manage, manipulate, process, etc. genomic data.

In one general embodiment, a computer program product for driving workflows using metadata includes a computer readable storage medium having program instructions embodied therewith. The program instructions are executable by a processor, and cause the processor to: initiate a workflow configured to process data; associate the data with metadata comprising: anchoring metadata configured to uniquely identify the workflow; common metadata comprising one or more characteristics selected from: sample characteristics, processing site characteristics, laboratory characteristics, instrument characteristics, assay characteristics, temporal characteristics, security characteristics and project characteristics; and custom metadata comprising one or more of workflow characteristics and data characteristics; and drive at least a portion of the workflow based on at least some of the metadata.

In another general embodiment, a method for managing genomic data processing workflows using metadata includes: initiating a workflow; receiving a request to manage the workflow using metadata; associating the metadata with the data; and driving at least a portion of the workflow based on the metadata. The metadata comprise: anchoring metadata, common metadata, and custom metadata, and the workflow includes one or more genomic analysis operations selected from: base calling; sequence alignment, variant calling, phylogenetic analysis, primer design, amplicon design, and homology analysis.

In still another general embodiment, a computer program product for driving workflows using metadata includes a computer readable storage medium having program instructions embodied therewith. The program instructions are executable by a processor, and cause the processor to: receive workflow data and metadata associated with the workflow data; distribute the workflow data and the associated metadata across a plurality of distributed resources of a cloud computing environment; and index the workflow data according to the metadata. The metadata include plural generations of metadata, and each generation corresponds to at least one operation of the workflow.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
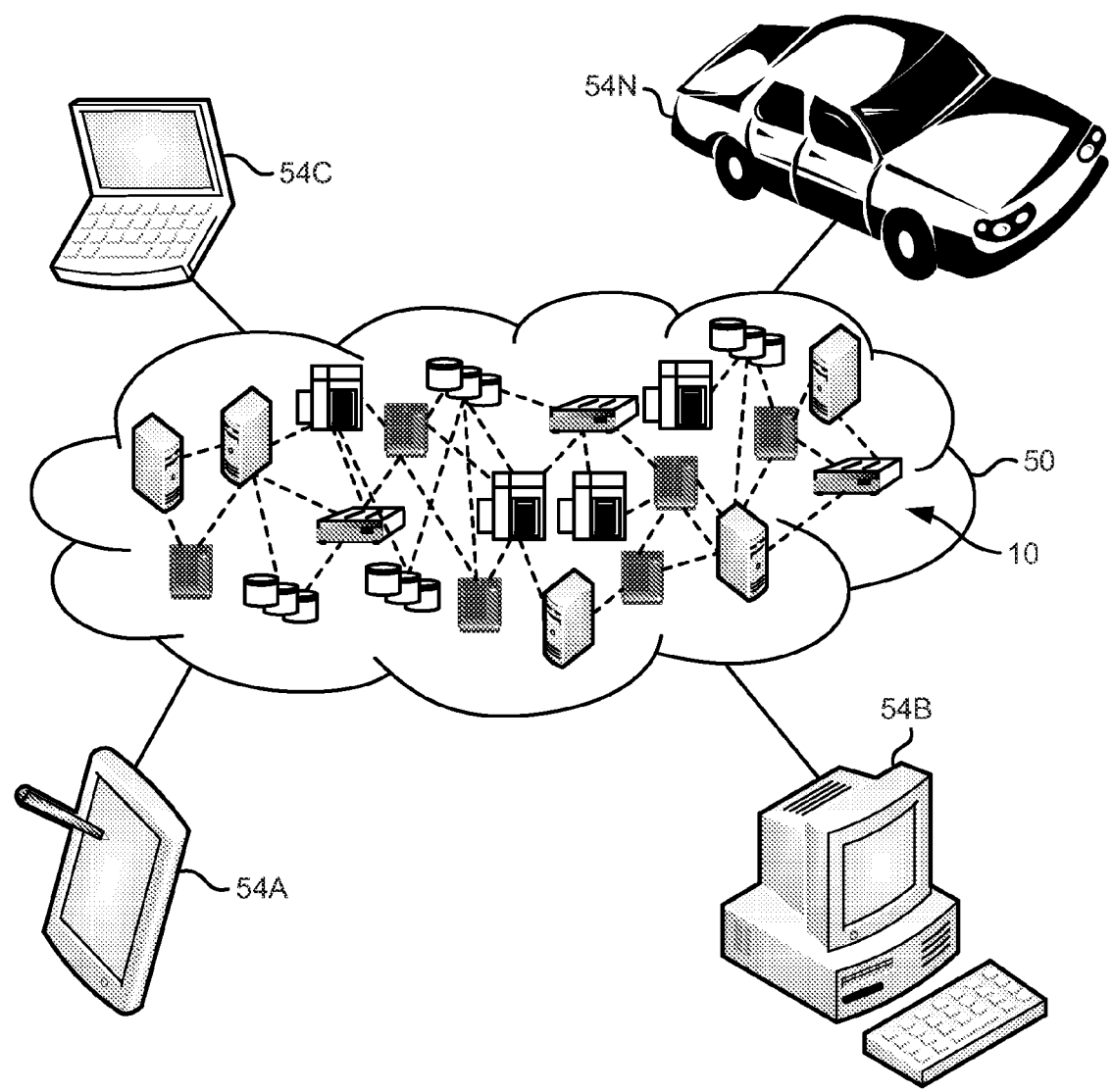
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
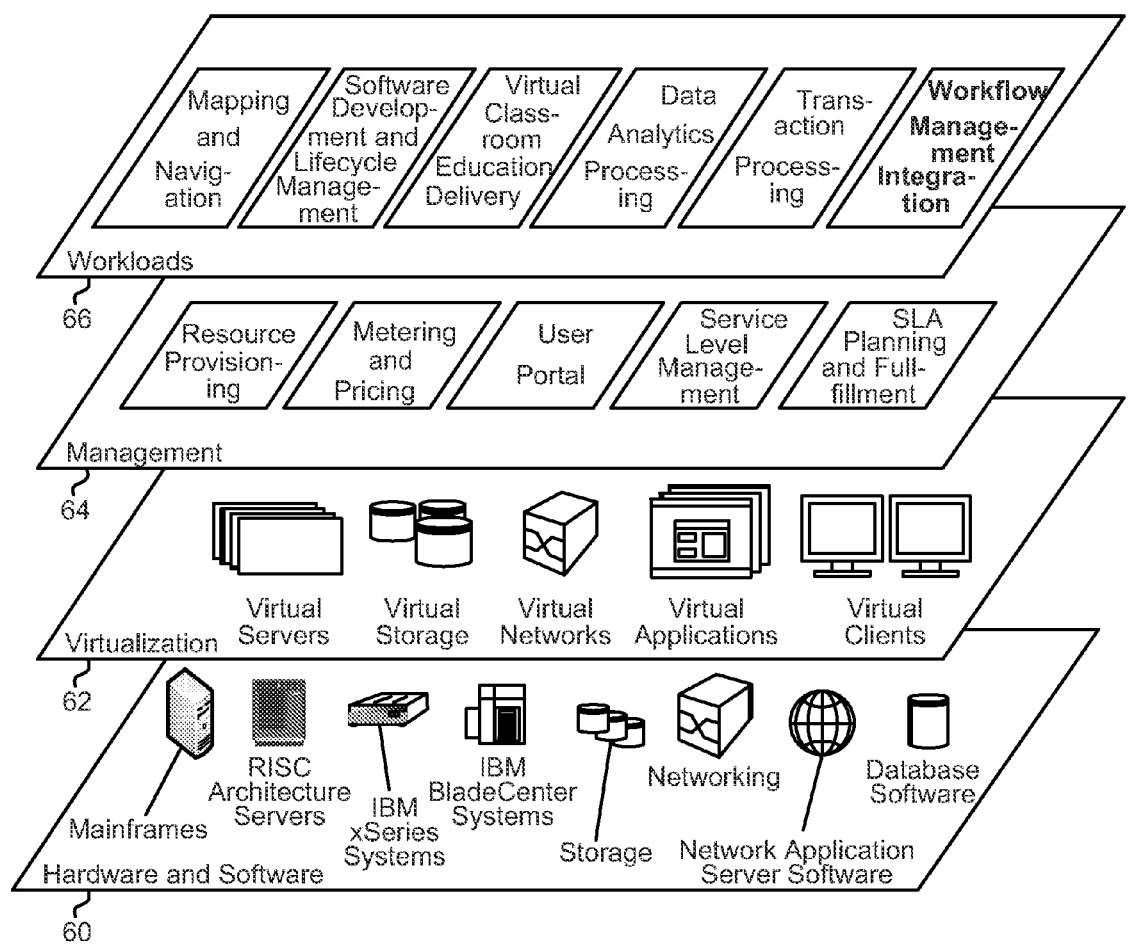
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; as well as workflow and metadata management/integration, in a preferred approach.

Workflow and metadata management/integration may include any number of a host of functionalities. Particularly preferable among these are metadata-driven workflow management; genomic analysis workflow management; metadata management; genomic data management; and genomic data analysis (especially base calling; sequence alignment; variant calling; sequence annotation; phylogenetic analysis; etc. as would be understood by one having ordinary skill in the art upon reading the present descriptions).

Workloads layer 66 preferably also preferably provides functionality configured to integrate the presently disclosed metadata-driven workflows with any number of downstream analytical functions, techniques, systems, algorithms, etc. Preferred downstream integration includes preparing the genomic data and/or genomic metadata for additional analysis and/or processing.

In various embodiments, data and/or metadata preparation may include formatting the data and/or metadata in a manner sufficient to be provided as input to the downstream process/system.

In more embodiments, preparation may additionally and/or alternatively include parsing the data and/or metadata. For example, parsing may include processing the data to identify, extract, duplicate and/or manipulate portion(s) of the data and/or metadata that are pertinent to the downstream process/system. In a preferred approach, parsing the data and/or metadata may include identifying, manipulating and/or replicating (in data) a particular region of interest within the sequence. Exemplary regions of interest may include a homologous sequence region, part or all of a particular chromosome, a cassette, a locus, a gene, a transcription initiation site, a single nucleotide polymorphism (SNP), a hybridization or binding site for a molecule of interest, etc. as would be understood by one having ordinary skill in the art upon reading the present descriptions.

The downstream process(es) preferably comprise analytical tools configured to perform one or more of genomic analyses; genetic data analyses, amino acid or protein analyses, etc. such as sequence annotation, sequence protein modeling (e.g. protein folding prediction, protein function prediction, etc.); etc. as would be understood by one having ordinary skill in the art upon reading the present descriptions.

The present techniques may optionally include preparing data and/or metadata for processing and/or submission to genomic data analysis "pipelines" (e.g. such as embodied in one particular instance as workflow 400 described in further detail below and depicted in FIG. 4); genomic and/or genetic data repositories (e.g. the National Center for Biotechnology Information (NCBI) GenBank, the DNA DataBank of Japan (DDBJ), the European Molecular Biology Laboratory (EMBL), etc.); genomic data processing centers; cloud computing environments; parallel processing environments; etc. as would be understood by a skilled artisan reading the instant disclosure.

Metadata-Driven Workflows

Figure 4:
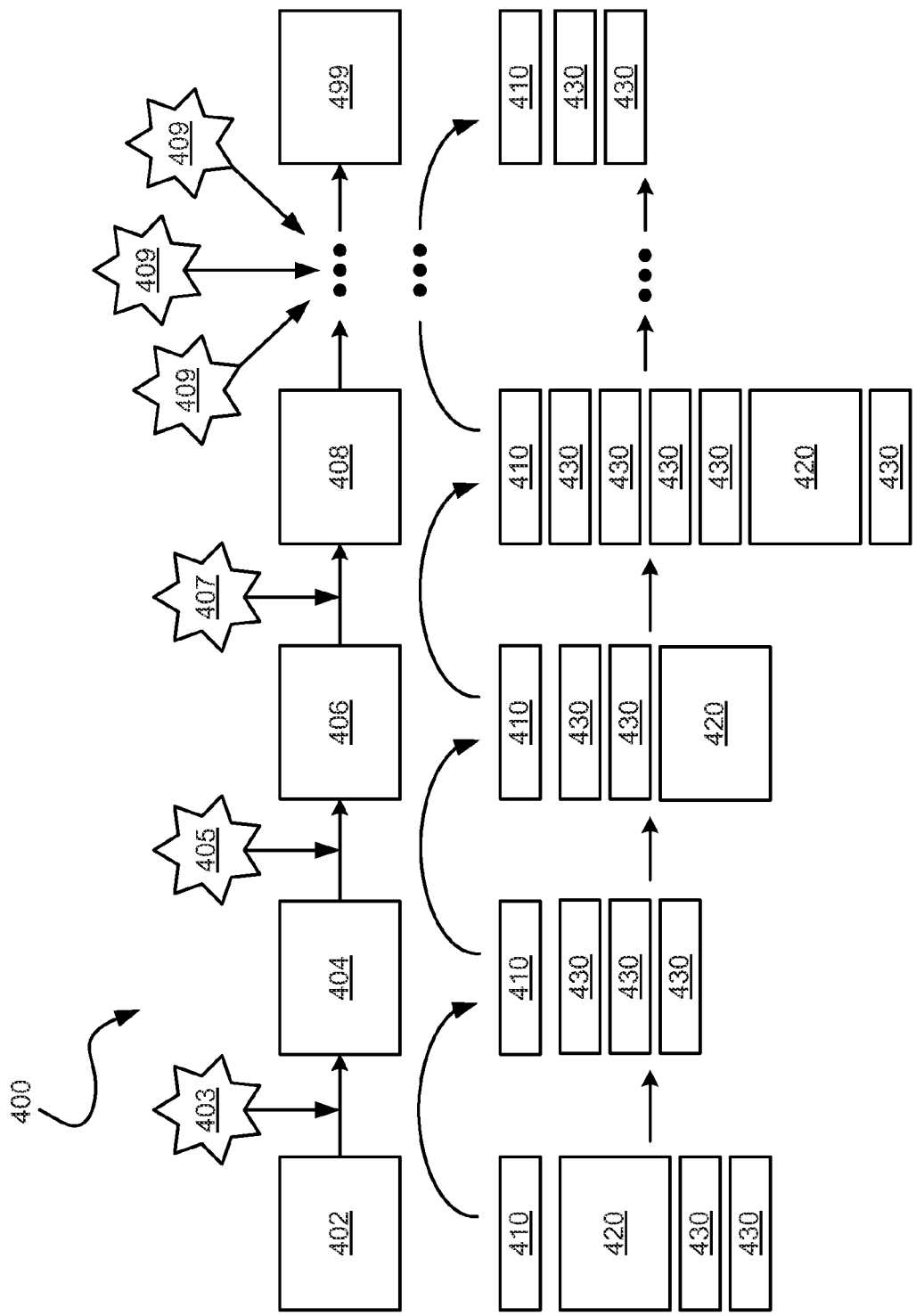
FIG. 4 depicts an exemplary workflow process and corresponding metadata, according to one embodiment.

The foregoing inventive concepts will now be presented with reference to an exemplary embodiment of a metadata-driven workflow 400 depicted in FIG. 4. The workflow 400 may include any number or type of suitable operations, data, metadata, tools, and etc. as would be understood by one having ordinary skill in the art upon reading the present descriptions. While the workflow 400 is described below from the illustrative perspective of a genomic data analysis workflow, it should be understood that the presently disclosed principles may be equally applied to any number of different types of workflows operating on any different number or type of instrument and/or compute resource configurations. Genomic data analysis is merely one example of a particularly suitable type of workflow 400 that benefits from leveraging the instant metadata-driven concepts.

Moreover, the presently disclosed systems, techniques, and computer program products are particularly advantageous and applicable to metadata creation scenarios where (1) metadata are created and associated with workflows, workflow data, etc. dynamically as a workflow progresses, e.g. as part of one or more file system I/O operations; and/or (2) metadata are generated in a large patch as part of a "harvesting" operation wherein workflow data are collected and metadata are applied thereto, e.g. as part of a file system I/O operation one embodiment.

Similarly, the presently described systems, computer program products, and/or techniques are particularly applicable to metadata consumption cases where, for example, part or all of a workflow must or should advantageously be repeated (e.g. to account for data corruption, to adjust processing parameters, etc.), and associated data must be located and assembled to perform the repetition. The presently described metadata allows users to leverage the metadata to drive the workflow or partial workflow repetition by invoking the necessary workflow tools/operations with respect to the workflow data, necessary information regarding each of which are preferably indicated in the metadata, as described in further detail below.

Moreover, in additional embodiments the present metadata-driven workflows may advantageously improve processing efficiency and/or speed by enabling workflow data and/or workflow operations to be parallelized and distributed across a plurality of computational resources to maximize the efficiency of the workflow operation as a whole, as would be understood by one having ordinary skill in the art upon reading the present descriptions. Since division and tracking of data for parallelization purposes is a burdensome but tedious task, the present metadata-driven workflows are configured to provide facile data segmentation, processing parallelization and commensurate data tracking, and processed data reintegration in a seamless and user-transparent manner.

Preferably, a user invoking a workflow merely indicates whether the workflow should attempt to parallelize (or equivalently distribute, e.g. in cloud computing environments) one or more portions thereof, and in response to determining the indication, performs the indicated processing scheme using some or all of the knowledge reflected in the metadata, particularly for purposes of tracking the data throughout the parallel processing and ultimately reintegrating the processed data portions into a single processed dataset.

In various approaches, the presently described metadata may be dynamically created, indexed, managed and/or searched throughout the course of performing a workflow, essentially creating a plurality of "snapshots" of the data and/or associated metadata according to each step in the workflow. For example, using the genomic analysis scenario as a framework, metadata may be dynamically created, indexed, managed and/or searched in response to initiating and/or completing each operation in the genomic analysis workflow, such as before and after a base calling operation, before and/or after a sequence alignment operation, before and/or after a variant calling operation, etc. as would be understood by one having ordinary skill in the art upon reading the present descriptions.

Similarly, each of the "snapshots" may be considered or correspond to a "generation" of metadata descriptive of the data before or after the snapshot was taken. Throughout the course of a workflow, metadata may be dynamically generated, indexed, searched, etc. according to a plurality of such "generations" and may replace or be concatenated with corresponding metadata from a prior "generation" in various approaches.

In one embodiment, using custom metadata characteristics as an exemplar, data characteristics such as described further below may change with each generation of metadata. For instance, in one approach custom metadata comprising a file format may change with each generation, e.g. a first generation of metadata may include custom metadata indicating a file format is a base-calling file or ".bcf" format. A second generation of the metadata may indicate the file format is a format compatible with a sequence alignment operation, such as a FASTA or FASTQ file format. A third generation of the metadata may indicate the file format is a format compatible with a sequence variant calling operation, such as a Sequence Alignment/Map (SAM) or Binary Alignment/Map (BAM) file format.

In the aforementioned example, the metadata characteristic comprising the file format may change as each generation of the metadata is generated throughout the course of the workflow, and may either replace a value of corresponding metadata from the prior generation, or may be concatenated as new metadata descriptive of the corresponding data characteristic as it existed in the corresponding generation. In such embodiments where subsequent generations of metadata are concatenated onto previous generations, it is advantageous to include in the metadata an indicator of the generation with which that particular metadata are associated/were generated to allow facile indexing and retrieval of the metadata.

As shown in FIG. 4, in general a workflow 400 includes data 402, 404, 406, 408, . . . 499, metadata e.g. anchoring metadata 410, common metadata 420, and/or custom metadata 430, associated with the data 402, 404, 406, 408, . . . and/or 499, and a plurality of workflow operations (represented by arrows between the various stages of the data/metadata) carried out using one or more workflow tools 403, 405, 407, 409, etc.

Workflow tools 403, 405, 407, 409, etc. may comprise any suitable tool for conducting data acquisition, processing and/or management, such as native operating system and/or file system functions, standalone applications; browser or application plugins, applets, etc.; commercial or open source libraries and/or library tools, custom scripts (particularly Perl and/or Python scripts and even more particularly scripts leveraging one or more sequence analysis libraries or library modules, such as a BioPerl and/or Biopython libraries or tools, etc.) or other tool useful for data acquisition, management, and/or processing such as described herein and would be appreciated by a skilled artisan upon reading the present descriptions.

The data transform in the course of carrying out the various workflow operations. Each transformation of the data corresponds to one of the workflow operations having been performed on the data. Thus, as represented in FIG. 4, for example, data in a first state 402 is subjected to a first workflow operation using workflow tool 403.

In some approaches, if a workflow operation fails, next data (e.g. 404 is "next data" to first data 402 in FIG. 4) may not be generated, and instead an error report may be generated and optionally reported to one or more technicians, analysts, system managers, or other users or administrators such as would be appreciated by a skilled artisan reading the present descriptions.

In the context of a genomic data analysis scenario, for example, first data 402 may be input to a workflow substantially in a format representing data output from an instrument or instrument such as a sequencing instrument (e.g. instrument models such as an ABI 3730, SOLiD, 454 pyrosequencer. Illumina HiSeq, etc. as would be understood by one having ordinary skill in the art upon reading the present descriptions). The first data 402 may optionally be subjected to one or more post-instrument (or pre-workflow, equivalently) processing operations, such as may be useful to convert data from a format as output from an instrument into a format acceptable as input to the workflow 400, in one embodiment.

At each stage in the workflow, or at each data state, respectively, metadata 410, 420, 430 are associated with corresponding workflow data 402, 404, 406, 408, . . . 499. The metadata include anchoring metadata 410, common metadata 420 and (optionally, in at least some stages of the workflow 400) custom metadata 430. The metadata associated may or may not change at each stage in the workflow, and preferably may change according to one or more features of the data transformed in an immediately previous workflow operation (using tools 403, 405, 407, 409, etc.).

Preferably, in at least one embodiment, anchoring metadata 410 remain constant throughout the course of workflow 400, while at least one of common metadata 420 and custom metadata 430 preferably change with each operation in the workflow 400. In this manner the metadata may provide all requisite information for a hosting file system (e.g. general parallel file system or GPFS in preferred embodiments) to manage the workflow using the metadata.

For example, anchoring metadata 410 that remain constant throughout a workflow progression (and particularly preferably that remain constant for an entire duration with which the anchoring data are associated with workflow data, i.e. even after completion of the workflow) may be leveraged to quickly identify, retrieve, duplicate, analyze, process and/or reprocess all data associated with the workflow 400, at each of the various stages making up the workflow 400. Further description of various types of information that may be contained in and/or represented by anchoring metadata 410 are discussed in further detail below, according to one embodiment.

Similarly, common metadata 420 that remain constant from one stage of a workflow progression to another may be utilized to quickly identify, retrieve, duplicate, analyze, process and/or reprocess all data associated with the workflow 400, at each of the various stages having at least one common characteristic as represented by the common metadata 420. Further description of various types of information that may be contained in and/or represented by common metadata 420 are discussed in further detail below, according to one embodiment.

In more approaches, custom metadata 430 that change with each stage in a workflow 400 may be leveraged to quickly identify, retrieve, duplicate, analyze, process and/or reprocess all data associated with the workflow 400, at a specific stage corresponding to the custom metadata 430. Further description of various types of information that may be contained in and/or represented by common metadata 420 are discussed in further detail below, according to one embodiment.

In one approach, a single piece of custom metadata 430 is sufficient to identify data in a particular state, and/or corresponding to a particular stage of a workflow 400. The custom metadata 430 may define a position or number corresponding to a particular workflow stage/data sate in an overall sequence of workflow operations.

For example, and with reference to FIG. 4, custom metadata 430 corresponding to data state 402 may indicate that the particular data state 402 with which the custom metadata 430 are associated is a first step in the progression of workflow 400 (e.g. "Step=1" in one embodiment). Similarly, data states 404, 406, 408 may each be associated with at least one piece of custom metadata 430, respectively indicating that data state 404 corresponds to a second step in the progression of workflow 400, data state 406 corresponds to a third step in the progression of workflow 400, data state 408 corresponds to a fourth step in the progression of workflow 400, etc. as would be understood by one having ordinary skill in the art upon reading the present descriptions.

In more approaches, multiple pieces of custom metadata 430 may be utilized in combination to more specifically identify, retrieve, analyze, process, etc. data corresponding to a specific combination of criteria. For example, in one embodiment a first piece of custom metadata 430 is sufficient to identify a particular step in a workflow progression such as described above. For this example, assume the first piece of metadata indicates a second step, corresponding to data state 404 as shown in FIG. 4.

A second piece of custom metadata 430 indicates a particular application that is, was, or will be utilized to perform at least one processing operation, such as may be performed preferably using one or more of the workflow tools 403, 405, 407, 409, etc. The application identified in the second piece of custom metadata preferably is embodied as a string such as a name, abbreviation, or unique code indicating the corresponding workflow tool(s) utilized in connection with a least one processing operation corresponding to that data state (404 according to the present example) or an adjacent data state (e.g. data states 402 and 406 are adjacent data state 404 as shown in FIG. 4.).

A third piece of custom metadata 430 indicates a version of the particular application used to perform the at least one processing operation discussed in above.

Utilizing a combination of the first, second, and/or third metadata 410, 420, and/or 430, specific queries may be built and employed to quickly locate data meeting characteristics specified in the query.

In one illustrative approach, a workflow routinely produces corrupted data as output. One or more applications leveraged in the course of the workflow were recently updated to a new software version. A technician troubleshooting the workflow may conveniently locate and evaluate data input to, processed by, and/or output from the recently updated application(s) by leveraging the custom metadata 430. For example, the technician may build a query seeking data having associated therewith custom metadata 430 matching the application name (e.g. using second metadata 430 described above) and version (e.g. using third metadata 430) suspected of causing the problematic data corruption.

Another piece of custom metadata 430 indicates a particular application utilized to perform at least one processing operation, such as may be performed preferably using one or more of the workflow tools 403, 405, 407, 409, etc. Moreover, the at least one processing operation corresponds to that data state or an adjacent data state (e.g. data states 402 and 406 are adjacent data state 404 as shown in FIG. 4.) Yet another piece of custom metadata indicates a version of the particular application used to perform the at least one processing operation.

In more embodiments, the technician may further tailor queries to leverage common metadata 420. For example, in one modification of the foregoing update scenario, the corrupted data are also confined to being generated using a particular instrument. While the corrupted data are exclusively produced using that particular instrument, other data are produced using the instrument, and some of the other data are periodically corrupted. In all, it may be difficult to identify the source of the problem and cumbersome to design and implement a series of experiments sufficient to isolate the cause of the problematic data corruption.

In order to isolate and/or identify the source of the problem, a technician wishes to review data corresponding to the particular instrument (e.g. the data output from the instrument) and which were also processed using the recently updated application (e.g. as described above). In one approach, this may be accomplished by building a query specifying the suspected application name, version number, and instrument ID. The query would locate only those data having associated therewith custom metadata corresponding to the application name (e.g. using second custom metadata 430 described above) and version (e.g. using third custom metadata 430), as well as having associated therewith common metadata 420 specifying the particular instrument ID.

Anchoring Metadata

As understood herein, "anchoring metadata," such as represented according to one embodiment in FIG. 4 by anchoring metadata 410, includes any type of metadata that may be utilized to identify other types of metadata and/or other data associated data corresponding to a particular workflow 400.

Preferably, the anchoring metadata 410 remains constant throughout a course of a workflow 400. In this manner, anchoring metadata 410 may serve as a tool allowing the system and/or users to investigate various aspects of data 402, 404, 406, 408 . . . 499 at various stages of the workflow 400 process, as would be understood by one having ordinary skill in the art upon reading the present disclosures.

In particularly preferred embodiments, the workflow identifier is a unique identifier comprising an alphanumeric string.

Moreover, the anchoring metadata 410 remain constant throughout the course of the workflow 400, and therefore serves as a tool to identify individual workflows 400, and optionally any metadata (e.g. common metadata 420 and/or custom metadata 430) and/or data 402, 404, 406, 408 . . . 499 associated with a the workflow 400. For example, in embodiments where anchoring metadata 410 comprises an alphanumeric string, the alphanumeric string is not changed throughout the course of performing the various operations of the workflow 400, and reflects an identical value when associated with each data 402, 404, 406, 408 . . . 499.

Even more preferably, the association between the particular workflow 400 and associated anchoring metadata 410 reflects a one-to-one relationship; i.e. the anchoring metadata 410 is uniquely associated with the workflow 400, and no other workflow(s), while the workflow 400 is uniquely associated with the anchoring metadata 410 and no other anchoring metadata. Of course, the anchoring metadata 410 need not necessarily maintain a one-to-one relationship with the particular workflow 400, in other approaches.

Moreover, anchoring metadata 410 are configured to identify the workflow 400 from among a plurality of (optionally related) additional workflows (not shown). Preferably, the anchoring metadata 410 are configured to uniquely identify the workflow 400, e.g. using a unique workflow identifier as described above.

In some approaches, anchoring metadata 410 may be leveraged by the file system, operating system, etc. hosting/processing the workflow 400 and associated workflow data 402, 404, 406, 408 . . . 499 to identify the workflow 400 and/or associated data. In one illustrative approach, anchoring metadata 410 associated with a particular workflow 400 comprises an alphanumeric string substantially representing a similar format and similar values as utilized by the file and/or operating system hosting the workflow 400 to uniquely identify processes or jobs. In a particularly preferred embodiment, therefore, anchoring metadata 410 comprises an alphanumeric string (workflow ID) that may be interchangeably used by the hosting file system/operating system as a "process identifier" or "PID"; a "job identifier"; "job number"; etc. as would be understood by one having ordinary skill in the art upon reading the present descriptions.

In preferred embodiments, the anchoring metadata 410 may be leveraged to describe and/or subsequently determine one or more characteristics of a workflow 400 (e.g. file system, operating system, etc.) and/or associated workflow data 402, 404, 406, 408 . . . 499. In particularly preferred embodiments, anchoring metadata may be leveraged to locate and/or retrieve common and/or custom metadata 420, 430 associated with one or more of the anchoring metadata 410 and the workflow 400 uniquely identified by the anchoring metadata 410.

Advantageously, upon locating/retrieving the common and/or custom metadata, 420, 430 the hosting system, or a user interacting with the hosting system may accordingly determine characteristics descriptive of, and associated with, the workflow 400 and/or workflow data 402, 404, 406, 408 . . . 499. Exemplary information represented via the aforementioned characteristics will be described in further detail below with respect to common and custom metadata 420, 430.

Common Metadata

Generally speaking, metadata referred to herein as "common metadata" (e.g. common metadata 420 as depicted in FIG. 4) should be understood to include any type of metadata that is/are 1) shared among various processes comprising a workflow, 2) commonly associated with at least one shared piece of anchoring metadata 410 and/or 3).

Preferably, and as depicted schematically in FIG. 4 according to one embodiment, various common metadata 420 applicable to a particular workflow 400 are associated with a single piece of anchoring metadata 410 also associated with the particular workflow 400, (e.g. a piece of anchoring metadata 410 comprising a workflow ID).

In additional embodiments, common metadata 420 preferably include information descriptive of the data with a particular experiment characteristic or characteristics.

As understood herein, "common metadata characteristics" may include any type of experiment-oriented information relevant to the workflow as a whole, or individual operations thereof. For example, a system configured to process workflow data may include a plurality of processing algorithms, schemes, protocols, etc. configured to perform one or more of a variety of data processing operations using the workflow data.

In a preferred approach, the system may determine which processing algorithm, scheme, protocol, etc. to utilize with respect to the workflow data based at least in part on associated common metadata characteristics, i.e. the characteristics of the experiments conducted to generate the workflow data (or "raw" data from which the workflow data were derived, in additional approaches). Additionally and/or alternatively, the system may select one or more settings or parameters to be used in conjunction with the selected processing algorithm, scheme, protocol, etc. Preferably, the selection is based at least in part on the common metadata characteristics.

For example, and again referring to the exemplary genomic sequence data generation and processing scenario, common metadata characteristics are preferably implemented as one or more alphanumeric strings having a key=>value type relationship. The illustrative common metadata characteristics include information such as: sample characteristics, processing site characteristics laboratory characteristics; instrument characteristics, assay characteristics; project characteristics, funding characteristics, temporal characteristics; security characteristics; personnel characteristics; etc. as would be; etc. as would be understood by one having ordinary skill in the art upon reading the present descriptions.

Sample Characteristics

Sample characteristics as understood herein include any type of information descriptive of a particular sample that was utilized to generate some or all of the data being managed, stored, processed, etc. using the workflow. For example, in one illustrative approach sample characteristics may include a sample ID number such as an alphanumeric string.

Of course, in myriad embodiments, sample characteristics may include any type of information such as may be generally utilized in recording, labeling, tracking, etc. laboratory samples and/or data, e.g. using a Laboratory Information Management System (LIMS) as would be understood by one having ordinary skill in the art upon reading the present descriptions.

Processing Site Characteristics

Processing site characteristics, as understood herein, may include any type of information suitable for identifying a physical or virtual location where the data are and/or will be processed in whole or in part in the course of conducting the workflow. For example, in one approach a site characteristic may include a site name (e.g., a site abbreviation (e.g. DoE_Bank1 for a first processing bank managed by the Department of Energy, etc.) a site address (e.g. a street or network address), a site identifier such as an alphanumeric string, etc.

as would be understood by one having ordinary skill in the art upon reading the present descriptions.

Laboratory Characteristics

In one approach, exemplary laboratory characteristics may include an identity of the physical site where raw (e.g. sequence) data were generated, which may be identified using a unique string, preferably an alphanumeric string corresponding to the physical location.

Instrument Characteristics

Instrument characteristics, similarly, may include an (optionally unique) identifier descriptive of and/or associated with a particular instrument, such as an instrument model name or number, a unique instrument ID, a room number in which the instrument is located, etc. as would be understood by one having ordinary skill in the art upon reading the present descriptions.

Assay Characteristics

Assay characteristics may include information identifying one or more biological assays performed in the course of generating the data or in association with the generated data. For example, in one approach assay characteristics may identify a type of chemistry utilized to generate genetic source material to be utilized in downstream sequencing and sequence analysis. Preferably, the genetic source material is in the form of a library, more preferably a nucleic acid library such as a RNA library, a genomic DNA library, a transcriptome library, a complementary DNA (cDNA) library, a hybridization probe library, etc. as would be understood by one having ordinary skill in the art upon reading the present descriptions. In other approaches, assay characteristics may identify a type of isolation, separation, purification or preparation procedure to which the experimental material was exposed or subjected.

Temporal Characteristics

Temporal characteristics may include any information relating to timing of conducting one or more assays and/or workflow data processing operations. For example, in one approach temporal characteristics include a string identifying a date/time corresponding to conducting an experiment or assay of interest, a date/time corresponding to conducting an isolation, separation, purification or preparation procedure, etc. as would be understood by one having ordinary skill in the art upon reading the present descriptions.

Advantages offered by including temporal characteristics primarily include, but are not limited to troubleshooting, data retention, downstream data processing, and data management applications.

In one approach an instrument run fails. The failed run may include associated log data, error codes, corrupted data, "viable" data (i.e. potentially incomplete but otherwise usable data that is not corrupted), etc. as would be understood by one having ordinary skill in the art upon reading the present disclosures. The workflow may detect run failure, and based on detecting the failure and/or analyzing associated run failure data, the workflow may take appropriate remedial action.

In various approaches, run failure data may include, for example, error codes corresponding to the instrument, a network with which the instrument is in communication, a file system configured to store run data, etc. Run failure data may also include instrument log data, user input, etc. as would be understood by one having ordinary skill in the art upon reading the present descriptions.

In related approaches, a run may complete without any instrument errors, but data may nonetheless be compromised, e.g. due to a failure in memory, a failure or error during one or more data transfers, etc. The workflow may detect the compromised state of the data and take remedial action in response thereto.

As discussed herein, exemplary remedial action may include issuing a prompt or message to a technician including an indication of the run failure, a reason for the run failure (e.g. one or more error codes or messages from an instrument conducting the failed run), and/or an authorization request. The authorization request may include requests to take action such as deleting data corresponding to the failed run; attempting to salvage "viable" data from the failed run; storing or submitting run failure data (e.g. to an instrument manufacturer, servicer, support website, to a memory in communication with the instrument conducting the failed run, etc.); repeating the failed run using the same or new run conditions, processing parameters, etc.; or any other appropriate remedial action(s), as would be understood by one having ordinary skill in the art upon reading the present descriptions.

Additionally and/or alternatively, a data processing center configured to execute a workflow and process run data may be further configured to automatically repeat failed runs in response to detecting run failure, compromised data, and/or errors in the workflow. In this scenario, the processing center may identify a specific instrument or experimental material associated with a failed instrument run, and initiate a new or repeat run using different compute resources, different processing settings/parameters, different workflow operations, etc. as would be understood by one having ordinary skill in the art upon reading the present descriptions.

Temporal characteristics may optionally describe a timing of performing one or more procedures in the course of generating the data and/or conducting the workflow. For example, temporal characteristics may include, in one approach, a date and/or timestamp indicating when an experiment was conducted, a date and/or timestamp indicating a time when a pre- and/or post-experiment procedure (e.g. an amplification, a purification, an isolation, etc. such as described above) was conducted, etc. as would be understood by one having ordinary skill in the art upon reading the present descriptions.

Security Characteristics

Security characteristics may include any indication of a security status of workflow data and/or samples utilized to generate the workflow data. The security characteristics may be embodied as an encryption scheme, and/or comprise an alphanumeric string indicating the security status. For example, in some approaches security status may relate to data access, manipulation, etc. In other approaches, the security status may relate to a security level or protocol associated with sample(s) used to generate the workflow data, e.g. so-called "biosafety levels" or "BSL" indicators.

Project Characteristics

Project characteristics may include a string representing a project or projects with which the data are associated, Project characteristics may be particularly advantageous in embodiments leveraging (semi) automated laboratory data management, e.g. via a LIMS as discussed above, because a common project identifier may be utilized for both the storage/management of samples and data, as well as the downstream processing of experimental data associated with those samples. By utilizing project characteristics, therefore, data broadly relating to a project may be quickly located, identified, processed, etc. as described according to various exemplary embodiments herein.

In more approaches, the common metadata 420 may be leveraged in the context of parallel or distributed processing. For example, in some approaches common metadata 420 may include an indication that the associated data 402, 404, 406, 408 . . . 499 are to be processed in parallel using a plurality of processors; to be distributed across a plurality of processing sites (e.g. across a "cloud computing environment"), etc. The common metadata 420 may also include least one piece of information that may serve as a common link around which to separate and rejoin the associated data 402, 404, 406, 408 . . . 499 for purposes of parallel or distributed processing.

For example, in one approach common metadata 420 may include a flag indicating either that the associated data are to be processed in parallel or distributed across a cloud computing environment. The flag preferably represents a "yes/no" indicator of whether parallel processing or cloud computing is to be leveraged with respect to the associated data, such as "PP=Y" (parallel processing=yes) "CC=1" (cloud computing=yes), "PP=0" (parallel processing=no) "CC=F" (cloud computing=false), etc. as would be understood by one having ordinary skill in the art upon reading the present descriptions.

Custom Metadata

Generally speaking, metadata referred to herein as "custom metadata" such as represented by custom metadata 430 as depicted according to one embodiment in FIG. 4, should be understood to include any type of metadata that are 1) descriptive of at least a portion of a workflow 400 and/or associated data 402 404 406 408 . . . 499 (e.g. descriptive of the data, a process, an operation, or subset of processes/operations which the workflow comprises) and/or 2) associated with one or more of anchoring metadata 410 and common metadata 420.

In contrast to anchoring metadata 410 and common metadata 420 as described above, in one embodiment custom metadata 430 are characterized by changing at least in part in accordance with performing each operation in the workflow 400 (e.g. changing at least one value in an alphanumeric string comprising the custom metadata).

Put another way, in preferred embodiments the custom metadata describe at least some information uniquely associated with a particular stage in the progression of workflow 400, and/or a particular piece of workflow data 402, 404, 406, 408 . . . 499. In particularly preferred embodiments, at least one piece of custom metadata 430 associated with each piece of workflow data 402, 404, 406, 408 . . . 499 describes at least one unique characteristic of the piece of workflow data 402, 404, 406, 408 . . . 499 with which the piece(s) of custom metadata 430 is/are associated.

For example, in one approach custom metadata 430 comprise a file format of the correspondingly associated workflow data 402, 404, 406, 408 . . . 499. Since each workflow operation or tool (e.g. 403, 405, 407, 409) in the exemplary workflow 400 outputs processed workflow data 404, 406, 408 . . . 499 in a format unique to that tool.

In the exemplary scenario of genomic data analysis, and particularly genomic sequence analysis, a workflow 400 may include a first operation leveraging a first tool 403 to transform input data 402 into output data 404. The tool 403 requires input data 402 be formatted in a particular manner (e.g. a base calling tool 403 requires input data 402 be in a conventional format such as a ".bcf" file format) and produces output data 404 in a different format (e.g. FASTA or FASTQ format). Custom metadata 430 associated with the data 402, 404 may accordingly indicate that the data comply with the corresponding data format or file type (e.g. "FIL=BCF" for input data 402 and "FIL=FASTA" for output data 404, according to the genomic sequence example).

In more embodiments, the various tools 403, 405, 407, 409, etc. may include any number or type of genomic analysis tool, script, application, applet, plugin, etc. such as: base calling; sequence alignment, variant calling, phylogenetic analysis, primer design, amplicon design, homology analysis, etc. as would be understood by one having ordinary skill in the art upon reading the present descriptions.

Of course, custom metadata 430 may include information that is not necessarily uniquely descriptive of a single workflow operation, tool or data in a particular state. As noted above, the custom metadata 430 as defined herein are generally descriptive of at least a portion of a workflow 400, associated data 402 404 406 408 . . . 499 and/or metadata. In particularly preferred embodiments, custom metadata 430 describe the workflow 400 and/or associated data 402 404 406 408 . . . 499 via information including one or more of the following characteristics.

Data Characteristics

In one approach, custom metadata 430 include descriptive information comprising data characteristics, which should be understood to include any type of characteristic that is useful and/or relevant to storing, retrieving, accessing, migrating, duplicating, manipulating, etc. data stored and/or processed by a hosting system such as a file system and/or operating system.

For example, in one approach data characteristics pertain to part or all of the workflow 400, and may include information such as a file name, file format, file permissions (e.g. read/write/execute), a data creation date/time stamp, a last data modification date/time stamp, input/output (I/O) information and/or user information.

In some instances, the I/O information may comprise a pathname or directory from which a particular workflow operation receives or retrieves input data (e.g. 402, 404, 406, 408) and/or a directory from which the workflow invokes or calls one or more workflow tools (e.g. 403, 405, 407, 409); a directory to which the workflow operation and/or tool stores output data (e.g. 404, 406, 408 . . . 499), etc. as would be understood by one having ordinary skill in the art upon reading the present descriptions.

Similarly, user information may include information such as a user account name or home directory where input data for the workflow 400 are stored (e.g. a "source" directory), a user account name or home directory where workflow output data are stored (e.g. a "destination" directory); a user account name or directory by/from which a workflow 400 was invoked, submitted, or manipulated, a user account name corresponding to a user account that "owns" the data, (such as may be indicated by the data being stored in a user's home directory on the file system, by permissions, etc.) or any other user information pertinent to accessing, managing, and/or manipulating part or all of a workflow 400, associated data 402, 404, 406, 408 . . . 499 and/or metadata 410, 420, 430, such as would be understood by one having ordinary skill in the art upon reading the present descriptions.

Illustrative manipulations of a workflow 400 may include modifying a workflow 400 processing priority, suspending a workflow 400, modifying one or more compute resources assigned/allocated to processing the workflow 400, etc. in various approaches.

Workflow Characteristics

In more embodiments, custom metadata 430 may include information descriptive of part or all of a workflow, referred to herein as workflow characteristics. For example, custom metadata 430 may include workflow characteristics that describe an application and/or tool relied upon in the course of performing the workflow 400, such as an application/tool name, application/tool name version, application/tool name location (e.g. executable path), application/tool name permissions (e.g. list of users/processors that can access the tool(s), a list of data storage locations accessible by the tool(s), etc.).

Workflow characteristics, in various embodiments, may also include information descriptive of the particular portion of the workflow 400 with which the custom metadata 430 are associated, particularly in relation to the workflow 400 as a whole or other portions of the workflow 400. For example, workflow characteristics may include information such as a step or operation number corresponding to the portion of the workflow 400 with which the custom metadata 430 are associated. In one illustrative approach, the step or operation number may be embodied as an alphanumeric string defining a relative position of the particular portion of the workflow in an overall workflow sequence of operations, such as "STP=2"), a list of users/processors that can access the workflow, a list of file system directories/locations accessible by the workflow, etc. as would be understood by one having ordinary skill in the art upon reading the present descriptions.

Metadata Structure

As described generally above, the presently disclosed metadata are preferably embodied as one or more key/value pairs having a structure or relationship such as conventionally represented in relational databases such as the aforementioned relational data warehouse (DW). In some approaches, the metadata may be associated with the corresponding data, e.g. via a file reference or pointer, via the workflow ID being present in both the data and the metadata, etc. The metadata may further be organized substantially in a tabular structure such as represented schematically by each column of metadata 410, 420, and/or 430 shown below the data 402, 404, 406, 408 . . . 499 in FIG. 4 and reproduced in greater detail according to several exemplary embodiments FIGS. 5A and 5B.

In FIG. 5A, an exemplary tabular structure 500 is shown representing organization of metadata according to one embodiment. The table substantially represents key/value relationships between the values in adjacent columns of each row of the table 500. The left-hand column represents the key while the right hand column represents the corresponding value. Table 500 as shown in FIG. 5 includes anchoring metadata 410 in the form of a workflow ID 502, common metadata 420 in the form of a site characteristic, 504 an instrument characteristic 506, a project characteristic 508, a sample characteristic 510 and an assay characteristic 512, as well as custom metadata 430 in the form of workflow characteristics 520 including a step number 522, application name 524 and application version 526; as well as data characteristics 530 including a file type 532.

In FIG. 5B, a tabular structure 550 is shown representing organization of metadata according to another embodiment. The table 550 presents similar information as described above with reference to table 500 shown in FIG. 5A, but includes a slightly different organizational structure wherein the left column provides a longhand name corresponding to the type of information presented in the right-hand column, which includes an abbreviated version of the corresponding key and value depicted in FIG. 5A generally following the format "KEY=VALUE". Table 550 as shown in FIG. 5B depicts an identical set of anchoring, common, and custom metadata as described above with respect to table 500 shown in FIG. 5A.

Figure 6:
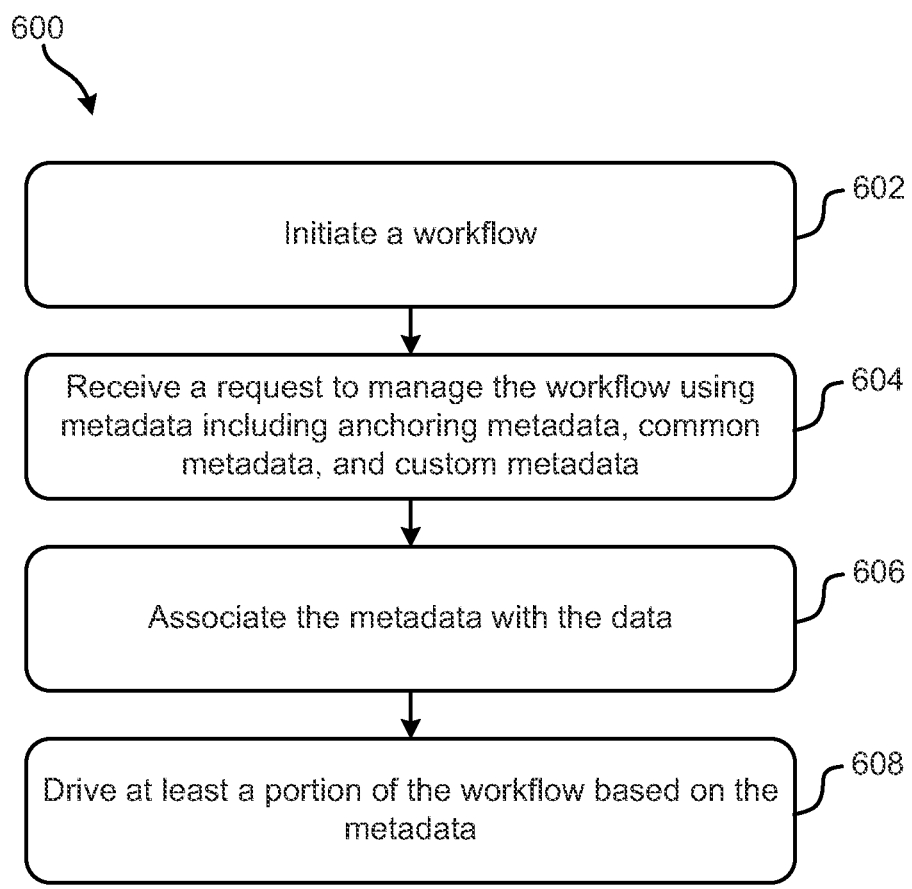
FIG. 6 is flowchart of a method, according to one embodiment.

Having described various features of the presently disclosed inventive metadata-driven workflows, an exemplary embodiment of a workflow method 600 is shown schematically according to the flowchart in FIG. 6 in one approach. The method may be practiced in any suitable environment, including those depicted in FIGS. 1-5B, among others, and may include additional and/or different operations than depicted in FIG. 6, in multiple permutations of the present descriptions such as would be understood by one having ordinary skill in the art once having read this disclosure.

For example, in one illustrative embodiment and as shown in FIG. 6, a method 600 for managing data processing workflows, and particularly genomic data processing workflows, includes operation 602. In operation 602, a workflow is initiated. The workflow may be initiated in any suitable manner, either a system hosting data to be processed by the workflow, by a system hosting one or more workflow tools, by a system receiving a request to initiate the workflow or a request to store the data, etc. The workflow may additionally and/or alternatively be initiated in the course of conducting another workflow, in response to completing another workflow, in response to detecting a failure or error in another workflow, etc. as would be understood by one having ordinary skill in the art upon reading the present descriptions.

With continuing reference to FIG. 6, method 600 also includes operation 604, where a request is received. The request is to manage the workflow using metadata. Moreover, the request preferably is a specific request to manage the workflow using metadata including anchoring metadata, common metadata, and custom metadata.

In operation 606, method 600 continues by associating the metadata with the data, preferably according to a relational structure such as a relational database. However, any type of suitable data association mechanism, technique, or convention may be employed without departing from the scope of the presently disclosed inventive concepts.

Method 600 also includes driving at least a portion of the workflow based on the metadata in operation 608. Driving the workflow may occur in a various different manners as described herein, including but not limited to parallelizing portions of the workflow across a plurality of (preferably distributed) compute and/or storage resources based on the metadata; repeating part or all of a workflow using same or different data and/or processing settings, parameters, workflow tools, etc. based on the metadata; initiating one or more additional workflows based on the metadata, etc.

Method 600 includes workflows where at least one genomic analysis function, tool, operation, or process is performed in the course of the workflow. Preferably, the genomic analysis operation includes operations selected from a base calling operation, a sequence alignment operation; a variant calling operation, a phylogenetic analysis operation, a primer design operation, an amplicon design operation, a homology analysis operation, a functional analysis operation, an amino acid translation operation; an RNA structural analysis operation, a regulatory sequence detection operation, a sequence annotation operation, etc. as would be understood by one having ordinary skill in the art upon reading the present descriptions.

In various approaches, the method 600 may include one or more additional and/or alternative features, such as described according to several illustrative implementations below.

For example, in one illustrative embodiment method 600 may additionally and/or alternatively include generating at least some of the metadata while performing the workflow. The generated metadata are preferably associated with the data while performing the workflow. Put another way, in one instance a workflow comprises a plurality of operations, and metadata descriptive of the data may be generated in association with completing each operation in the workflow.

In multiple embodiments, the metadata generation may be dynamic in that the type and values of the metadata are descriptive of various parameters, conditions, results, errors, etc. regarding the various workflow operations. In a scenario involving genomic data processing such as described herein, for example, custom metadata may be generated in connection with each operation in the genomic analysis workflow indicating the format in which the processed data were output by the corresponding operation.

In one embodiment, the custom metadata indicating file format may indicate data output from a base calling operation are in a predetermined sequence format (.fasta and/or .fastq, .gbk, etc. as would be understood by a skilled artisan upon reading the present descriptions); data output from a sequence alignment operation are in an alignment format (e.g. .SAM and/or .BAM); and data output from a variant calling operation are in a variant calling format (e.g. .VCF); and so on as would be appreciated by skilled artisans reading these descriptions.

Similarly, metadata may be generated in association with receiving data in a particular format and indicating that the metadata are in the particular format. The workflow may be driven at least in part based on the metadata indicating the particular format of the data by virtue of selecting one or more workflow tools to use to process the particularly formatted data. For example, in response to receiving one or more sequence files, e.g. in a .fasta format, a workflow may invoke a sequence alignment tool to drive the processing of the genomic data.

Regardless of the event(s) in connection with which metadata are generated, in particularly preferred embodiments, the metadata are generated by the file system as part of one or more input/output (I/O) operations. This metadata generation technique advantageously confers the beneficial capabilities offered by the presently described metadata-driven workflows without adding load to the file system I/O activity. In embodiments configured to process genomic data, and other similar data, such ability to confer the metadata-driven workflow functionality without adding to system I/O load is a key advantage since genomic data sets involve enormous volumes of data, both in terms of data amount (e.g. amount of storage space occupied by the data, preferably measured in bytes) and number of data items (e.g. number of files in a genomic data set). For similar reasons, this integrated I/O approach is also advantageous to utilize when leveraging distributed storage and/or processing resources to store, manage, migrate, access, process, etc. the data.

Accordingly, in some embodiments driving the workflow based at least in part on the metadata as described above with reference to method 600 may additionally and/or alternatively include: parallelizing at least one of the workflow operations across a plurality of dynamically selected compute resources. Moreover, the compute resources are selected dynamically from among a plurality of processing nodes of a local processing cluster, and a plurality of processing nodes of a cloud processing pool. Preferably, the compute resources are dynamically selected based on one or more of the common metadata and the custom metadata.

Continuing with the scenario involving distributed compute resources, in some approaches driving the workflow based on metadata includes identifying the metadata, e.g. from among the data, and preferentially based on the metadata's association with the data. Of course, metadata may be identified in any suitable manner, such as using a predetermined header, tag, file name, file type, etc. as would be understood by a skilled artisan upon reading the present descriptions.

In addition to identifying the metadata, driving the workflow based on the metadata may optionally include generating an output file comprising the metadata; and submitting the output file to a metadata repository. In this manner, metadata regarding the various data stored and/or processed across distributed compute resources may be shared in an easy and efficient manner, especially when leveraging native file system I/O functionality to create, manage, duplicate, migrate, etc. the metadata.

In more approaches, driving the workflow based on metadata may additionally and/or alternatively include determining new data and/or new processing settings to use in connection with repeating at least a portion of the workflow; and repeating the portion of the workflow using at least one of the new data and the new settings. Preferably, the new data and/or processing settings are based at least in part on one or more of the common metadata and the custom metadata. For example, new processing settings may include modifying a number of permissible gaps in an alignment based at least in part on an average sequence length of input sequence data, such as indicated in metadata associated with the input sequence data.

Now regarding the metadata types described above with reference to method 600 and FIG. 6, in one preferred approach the metadata include three types of metadata: anchoring, common, and custom. The anchoring metadata are configured to uniquely identify the workflow to a file system and an operating system hosting one or more of the workflow, the data and the metadata. Moreover, the anchoring metadata remain unchanged throughout the course of the workflow. The common metadata reflect characteristics selected from: sample characteristics, processing site characteristics, laboratory characteristics, instrument characteristics, assay characteristics, temporal characteristics, security characteristics and project characteristics; and the custom metadata reflect data characteristics and/or workflow characteristics. Exemplary descriptions of the various characteristics include any of the features described herein and as would be understood to be equivalent thereto by a skilled artisan reading the instant disclosures. Preferably, all of the custom metadata associated with a particular workflow correspond to the anchoring metadata configured to uniquely identify the workflow. In one embodiment, therefore, there exists a many-to-one relationship between the custom metadata associated with a workflow and the single piece of anchoring metadata used to uniquely identify the workflow.

Figure 7:
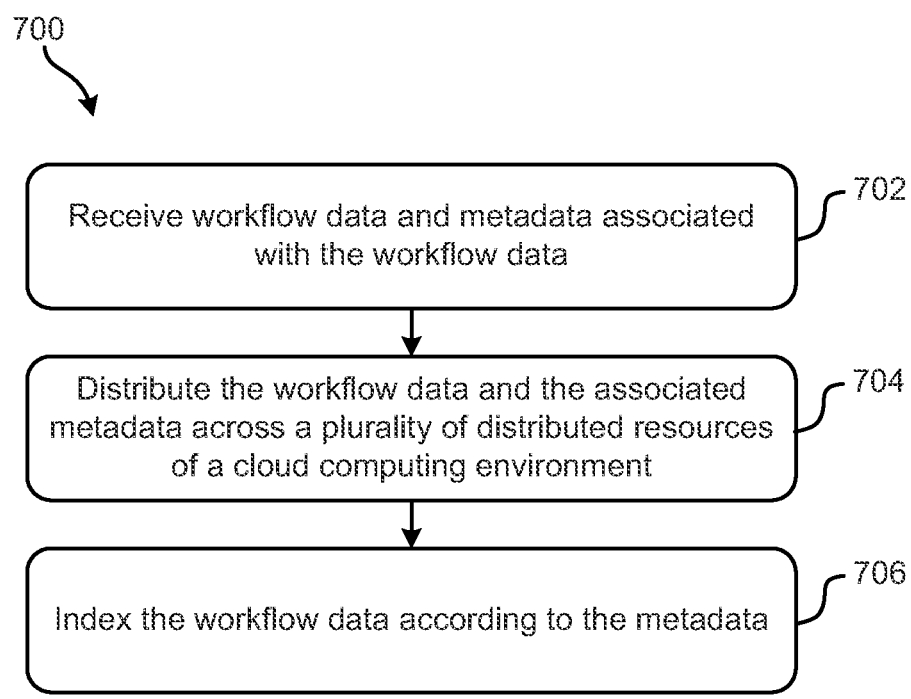
FIG. 7 is flowchart of a method, according to one embodiment.

In another embodiment, an exemplary workflow methodology 700 is shown schematically according to the flowchart in FIG. 7. The method 700 may be practiced in any suitable environment, including those depicted in FIGS. 1-5B, among others, and may include additional and/or different operations than depicted in FIG. 7, in multiple permutations of the present descriptions such as would be understood by one having ordinary skill in the art once having read this disclosure.

For example, in one illustrative embodiment and as shown in FIG. 7, method 700 includes operation 702, where workflow data and metadata associated with the workflow data are received.

With continuing reference to FIG. 7, method 700 also includes operation 704, where the workflow data and associated metadata are distributed across a plurality of distributed compute resources, preferably of a cloud computing environment.

In operation 706, method 700 continues with indexing the workflow data according to the metadata. The metadata include several generations of metadata, each generation corresponding to a particular operation (or set of operations) of the workflow. As described above, for example, each metadata generation may correspond at least in part to a new file format being generated by virtue of performing a corresponding workflow operation.

In various approaches, the method 700 may include one or more additional and/or alternative features, such as described according to several illustrative implementations below.

For example, in one approach the distributed data and/or metadata may be hosted by the cloud computing environment for facile and efficient management thereof, e.g. by facilitating users and/or other systems in communication with the cloud computing environment searching for the data, e.g. using the metadata as a repository and submitting one or more queries to the repository to locate specific metadata. The specifically located metadata may then be used to locate corresponding data, and perform one or more actions in response to locating the corresponding data, for example duplicating the data, migrating the data, submitting the data to one or more workflows, etc. as would be understood by one having ordinary skill in the art upon reading the present descriptions.

In a particularly preferred approach, therefore, method 700 optionally includes receiving a query corresponding to at least some of the metadata; locating data corresponding to the query based on the metadata; and distributing the located data to one or more remote destinations based on the query. Moreover, the remote destination(s) are not included in the cloud computing environment.

In at least some approaches, the metadata and/or data may be organized in a relational structure such as a relational database comprising key/value pairs where the metadata are the key and the data are values corresponding to the metadata key.

Moreover, method 700 in some approaches includes dynamically indexing the workflow data according to each generation of the metadata.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For example, in one embodiment a computer program product for driving workflows using metadata includes a computer readable storage medium having computer readable program code embodied therewith. The computer readable program code include: computer readable program code configured to initiate a workflow configured to process data; computer readable program code configured to associate the data with metadata; and computer readable program code configured to drive at least a portion of the workflow based on at least some of the metadata.

The metadata, according to some embodiments of the computer program product, include at least three distinct types of metadata such as: anchoring metadata configured to uniquely identify the workflow; common metadata descriptive of one or more characteristics selected from: sample characteristics, processing site characteristics, laboratory characteristics, instrument characteristics, assay characteristics, temporal characteristics, security characteristics and project characteristics; and custom metadata descriptive of one or more of workflow characteristics and data characteristics.

In more embodiments, the computer readable program code is further configured to dynamically create at least some of the metadata in response to driving the portion of the workflow; and store the dynamically created metadata.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for driving workflows using metadata, the computer program product comprising a computer readable storage medium having program instructions embodied therewith, the program instructions executable by a processor to cause the processor to:
   initiate, by the processor, a workflow configured to process data;
   associate, by the processor, the data with metadata comprising:
      anchoring metadata configured to uniquely identify the workflow;
      common metadata comprising one or more characteristics selected from: sample characteristics, processing site characteristics, laboratory characteristics, instrument characteristics, assay characteristics, temporal characteristics, security characteristics and project characteristics; and
      custom metadata comprising one or more of workflow characteristics and data characteristics; and
   drive, by the processor, at least a portion of the workflow based on at least some of the metadata,
   wherein driving the workflow based at least in part on the metadata comprises: parallelizing at least the portion of the workflow across a plurality of dynamically selected compute resources comprising at least one of: a plurality of processing nodes of a local processing cluster; and a plurality of processing nodes of a cloud processing pool, and
   wherein the compute resources are dynamically selected based on one or more of the common metadata and the custom metadata.

2. The computer program product as recited in claim 1, further comprising program instructions executable by the processor to cause the processor to:
   dynamically create at least some of the metadata in response to driving the portion of the workflow; and
   store the dynamically created metadata.

3. A method for managing genomic data processing workflows using metadata, the method comprising:
   initiating a workflow;
   receiving a request to manage the workflow using metadata comprising:
      anchoring metadata,
      common metadata, and
      custom metadata,
   associating the metadata with the data; and driving at least a portion of the workflow based on the metadata, wherein the workflow comprises one or more genomic analysis operations selected from: base calling; sequence alignment, variant calling, phylogenetic analysis, primer design, amplicon design, and homology analysis, wherein driving the workflow based at least in part on the metadata comprises: parallelizing at least one of the workflow operations across a plurality of dynamically selected compute resources comprising at least one of: a plurality of processing nodes of a local processing cluster; and a plurality of processing nodes of a cloud processing pool, and wherein the compute resources are dynamically selected based on one or more of the common metadata and the custom metadata.

4. The method as recited in claim 3, further comprising generating at least some of the metadata while performing the workflow, and wherein the generated metadata are associated with the data while performing the workflow.

5. The method as recited in claim 4, wherein the metadata are generated by a file system as part of one or more input/output (I/O) operations.

6. The method as recited in claim 3, wherein driving at least the portion of the workflow based at least in part on the metadata comprises:

determining at least one of new data and new settings to use in connection with repeating at least the portion of the workflow; and repeating the portion of the workflow using at least one of the new data and the new settings, wherein the determining is based at least in part on one or more of the common metadata and the custom metadata.

7. The method as recited in claim 3, wherein driving at least the portion of the workflow based at least in part on the metadata comprises:

identifying the metadata;

generating an output file comprising the metadata; and submitting the output file to a metadata repository.

8. The method as recited in claim 3, wherein the anchoring metadata are configured to uniquely identify the workflow to at least one of a file system and an operating system hosting one or more of the workflow, the data and the metadata, and wherein the anchoring metadata remain unchanged throughout the workflow.

9. The method as recited in claim 3, wherein the common metadata comprise one or more characteristics selected from: sample characteristics, processing site characteristics, laboratory characteristics, instrument characteristics, assay characteristics, temporal characteristics, security characteristics and project characteristics.

10. The method as recited in claim 3, wherein all of the custom metadata associated with the workflow correspond to the anchoring metadata configured to uniquely identify the workflow, and wherein the custom metadata comprises one or more of data characteristics and workflow characteristics.

11. A computer program product for driving workflows using metadata, the computer program product comprising a computer readable storage medium having program instructions embodied therewith, the program instructions executable by a processor to cause the processor to:

receive, by the processor, workflow data and metadata associated with the workflow data;

distribute, by the processor, the workflow data and the associated metadata across a plurality of distributed resources of a cloud computing environment; and index, by the processor, the workflow data according to the metadata;

receive a query corresponding to at least some of the metadata;

locate data corresponding to the query based on the metadata; and distribute the located data to one or more remote destinations based on the query, wherein the remote destination(s) are not included in the cloud computing environment; and wherein the metadata comprise a plurality of metadata generations, each metadata generation corresponding to at least one operation of the workflow.

12. The computer program product as recited in claim 11, wherein the cloud computing environment comprises a plurality of computer readable storage media configured as a cloud storage environment.

13. The computer program product as recited in claim 11, wherein the cloud computing environment comprises a plurality of processing nodes arranged in at least one cloud processing cluster.

14. The computer program product as recited in claim 11, wherein the cloud computing environment comprises a relational structure, wherein the relational structure is a relational database, and wherein the relational database comprises a plurality of key/value pairs.

15. The computer program product as recited in claim 14, wherein a value of each of the key/value pairs consists of at least some of the metadata.

16. The computer program product as recited in claim 11, wherein the workflow comprises one or more genomic analysis operations selected from: base calling; sequence alignment, variant calling, phylogenetic analysis, primer design, amplicon design, and homology analysis.

17. The computer program product as recited in claim 11, the program instructions executable by the processor to cause the processor to index the workflow metadata further comprising program instructions executable by the processor to cause the processor to dynamically indexing the workflow data according to each generation of the metadata.

18. The computer program product as recited in claim 11, wherein the metadata comprise:

anchoring metadata configured to uniquely identify the workflow;

common metadata configured to identify one or more experimental characteristics selected from: sample characteristics, processing site characteristics, laboratory characteristics, instrument characteristics, assay characteristics, temporal characteristics, security characteristics and project characteristics; and custom metadata comprising one or more of workflow characteristics and data characteristics.

\* \* \* \* \*